: US 7,846,582 B2

(12) United States Patent
Adachi et al.

(10) Patent No.: US 7,846,582 B2
(45) Date of Patent: Dec. 7, 2010

(54) NEGATIVE ELECTRODE, BATTERY USING THE SAME, AND METHOD OF MANUFACTURING NEGATIVE ELECTRODE

(75) Inventors: Momoe Adachi, Tokyo (JP); Isamu Konishiike, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 11/948,777

(22) Filed: Nov. 30, 2007

(65) Prior Publication Data

US 2008/0145762 A1   Jun. 19, 2008

(30) Foreign Application Priority Data

Dec. 19, 2006   (JP)  .......................... P2006-340729

(51) Int. Cl.
*H01M 4/60* (2006.01)
*H01M 6/16* (2006.01)
*H01M 4/48* (2010.01)

(52) U.S. Cl. .................... 429/212; 429/337; 429/218.1; 429/340; 429/341; 429/336

(58) Field of Classification Search ................. 429/188, 429/336–338, 340–343, 209, 212–213, 218.1
See application file for complete search history.

(56) References Cited

U.S. PATENT DOCUMENTS

| 6,051,340 | A | 4/2000 | Kawakami et al. |
|---|---|---|---|
| 6,482,550 | B1 * | 11/2002 | Imachi et al. ............... 429/338 |
| 6,685,804 | B1 | 2/2004 | Ikeda et al. |
| 7,192,673 | B1 | 3/2007 | Ikeda et al. |
| 7,195,842 | B1 | 3/2007 | Fujimoto et al. |
| 7,235,330 | B1 | 6/2007 | Fujimoto et al. |
| 7,241,533 | B1 | 7/2007 | Ikeda et al. |
| 2005/0014072 | A1 * | 1/2005 | Yamaguchi et al. ......... 429/329 |
| 2006/0024587 | A1 * | 2/2006 | Tamura et al. .............. 429/340 |

FOREIGN PATENT DOCUMENTS

| JP | 08-050922 | 2/1996 |
|---|---|---|
| JP | 11-135115 | 5/1999 |
| JP | 2002-083594 | 3/2002 |
| JP | 2002-313319 | 10/2002 |
| JP | 2005-158633 | 6/2005 |
| JP | 2005-197258 | 7/2005 |
| JP | 2005-285651 | 10/2005 |
| JP | 2004-349162 | 11/2007 |

* cited by examiner

*Primary Examiner*—Dah-Wei D Yuan
*Assistant Examiner*—Jacob Buchanan
(74) *Attorney, Agent, or Firm*—K&L Gates LLP (57) ABSTRACT

A negative electrode is provided. The negative electrode includes a negative electrode current collector, and a negative electrode active material layer formed over the negative electrode current collector, and including a plurality of columnar bodies. An organic material layer having ion conductivity is held by said negative electrode active material layer, said organic material layer is formed at least in an inside of each of said columnar bodies. The active material layer may include silicon.

16 Claims, 6 Drawing Sheets

| | Ls | SOLVENT OF ELECTROLYTIC SOLUTION | ORGANIC MATERIAL LAYER | Rz | β | α | ELEMENTS |
|---|---|---|---|---|---|---|---|
| EXAMPLE 1 | 8 | EC : DEC : VC | REDUCTION | 2.5 | 86 | 76 | Si, C, O |
| EXAMPLE 2 | 2 | FEC : DEC | REDUCTION | 2.5 | 88 | 78 | Si, C, O, F |
| EXAMPLE 3 | 5 | FEC : DEC | REDUCTION | 2.5 | 90 | 80 | Si, C, O, F |
| EXAMPLE 4 | 8 | FEC : DEC | REDUCTION | 2.5 | 94 | 80 | Si, C, O, F |
| EXAMPLE 5 | 8 | EC : DEC : VC : PRS | REDUCTION | 2.5 | 91 | 82 | Si, C, O, S |
| EXAMPLE 6 | 8 | DFEC : DEC | REDUCTION | 2.5 | 94 | 85 | Si, C, O, F |
| EXAMPLE 7 | 8 | FEC : DEC | COATING | 2.5 | 85 | 79 | Si, C, O |
| EXAMPLE 8 | 8 | FEC : DEC | COATING | 2.5 | 88 | 82 | Si, C, O, F |
| EXAMPLE 9 | 8 | FEC : DEC | REDUCTION | 1.5 | 86 | 73 | Si, C, O, F |
| EXAMPLE 10 | 8 | FEC : DEC | REDUCTION | 1.8 | 88 | 78 | Si, C, O, F |
| EXAMPLE 11 | 8 | FEC : DEC | REDUCTION | 2.0 | 93 | 81 | Si, C, O, F |
| EXAMPLE 12 | 8 | FEC : DEC | REDUCTION | 2.9 | 93 | 80 | Si, C, O, F |
| EXAMPLE 13 | 8 | FEC : DEC | REDUCTION | 3.5 | 94 | 79 | Si, C, O, F |
| EXAMPLE 14 | 8 | FEC : DEC | REDUCTION | 4.1 | 92 | 81 | Si, C, O, F |
| EXAMPLE 15 | 8 | FEC : DEC | REDUCTION | 4.5 | 92 | 79 | Si, C, O, F |
| EXAMPLE 16 | 8 | FEC : DEC | REDUCTION | 4.8 | 88 | 77 | Si, C, O, F |
| EXAMPLE 17 | 8 | FEC : DEC | REDUCTION | 5.0 | 86 | 72 | Si, C, O, F |
| EXAMPLE 1 | 8 | EC : DEC : VC | ABSENT | 2.5 | 78 | 73 | Si |
| EXAMPLE 2 | 2 | FEC : DEC | ABSENT | 2.5 | 83 | 74 | Si |
| EXAMPLE 3 | 5 | FEC : DEC | ABSENT | 2.5 | 84 | 74 | Si |
| EXAMPLE 4 | 8 | FEC : DEC | ABSENT | 2.5 | 83 | 76 | Si |
| EXAMPLE 5 | 8 | EC : DEC : VC : PRS | ABSENT | 2.5 | 82 | 78 | Si |

FIG. 6B

NEGATIVE ELECTRODE, BATTERY USING THE SAME, AND METHOD OF MANUFACTURING NEGATIVE ELECTRODE

CROSS REFERENCES TO RELATED APPLICATIONS

The present application claims priority to Japanese Patent Application JP 2006-340729 filed in the Japan Patent Office on Dec. 19, 2006, the entire contents of which is being incorporated herein by reference.

BACKGROUND

The present application relates to a nonaqueous secondary battery, and particularly to a negative electrode in which silicon or the like is used for forming a negative electrode active material layer so as to realized an enhanced capacity, a battery using the negative electrode, and a method of manufacturing such a negative electrode.

In recent years, mobile apparatuses have been enhanced in performance and in the number of their functions, and secondary batteries used as power supplies for the mobile apparatuses have been demanded to be reduced in size, thickness and weight, and to be enhanced in capacity. As a secondary battery capable of meeting the demands, there is the lithium (Li) ion secondary battery.

The characteristic features of the Li ion secondary battery vary largely depending on the electrode active materials used therein, and the like. In a typical Li ion secondary battery in practical use at present, lithium cobalt oxide is used as a positive electrode active material, and graphite is used as a negative electrode active material. However, the capacity of the Li ion secondary battery with this configuration is approaching to the theoretical value and, therefore, it is difficult to remarkably enhance the battery capacity by improvements in the future.

It has been known that the use of metallic Li as a negative electrode active material makes it possible to obtain a battery showing a high energy density. Such a battery, however, has the problem that when charge and discharge are repeated, deposition and dissolution of Li are repeated at the negative electrode, and Li would be deposited in a dendrite form on the negative electrode, leading to internal short-circuit. In order to obviate this problem, therefore, it has been proposed to replace the metallic Li with another active material, examples of which include transition metal chalcogenides; transition metal oxides; tin (Sn), silicon (Si), lead (Pb) and the like elements capable of alloying with Li, and alloys of these elements with Li. Now, the related art in which a material capable of alloying with Li is used as a negative electrode active material will be described below.

Patent Document 1 (set forth later) with the title "Electrode for Battery, and Lithium Secondary Battery Having the Electrode" contains the following description.

A Li secondary battery is a secondary battery having at least a negative electrode, a separator, a positive electrode, and an electrolyte or an electrolytic solution, wherein the negative electrode includes at least a metallic element capable of alloying with Li and a metallic element incapable of alloying with Li as constituents, and an output terminal on the negative electrode side is led out from a part of the metal incapable of alloying with Li. Where a metal incapable of alloying with Li is thus disposed at a negative electrode current collecting part, it is possible to restrain the current collecting ability from being lowered by pulverization and cracking which would arise from the deposition and dissolution of Li at the times of charge and discharge.

In addition, the negative electrode may be formed by a method in which a powdery material containing a metallic element incapable of alloying with Li is bound by a binder to a current collecting member formed from a metal incapable of alloying with Li, followed by or not followed by baking. With the negative electrode formed in this manner, it is possible to restrain the fatigue failure which might arise from repetition of both expansion due to alloying with Li at the time of charging and contraction due to dissolution of Li at the time of discharging.

Patent Document 2 (set forth later) with the title "Negative Electrode Material for Nonaqueous Secondary Battery, and Method of Manufacturing the Same" contains the following description.

A negative electrode active material is a semiconductor thin film including a simple material, or its compound, of at least one element which is selected from the group consisting of Group 3B, 4B and 5B elements and which is capable of insertion and extraction of Li ions. The semiconductor thin film is formed over a copper or stainless steel substrate, which is used as a current collector, by any one selected from among vacuum thin film forming methods such as vapor deposition, sputtering, ion plating, CVD, etc. Further, the semiconductor thin film formed by the vacuum thin film forming method is heat treated in a vacuum.

Patent Document 3 (set forth later) with the title "Electrode for Lithium Battery, and Lithium Battery and Lithium Secondary Battery Which Use the Same" contains the following description.

According to a first aspect, there is provided a Li battery electrode including an active material capable of insertion and extraction of Li, wherein non-crystalline Si is used as the active material. The "non-crystalline Si" includes amorphous Si and microcrystalline Si.

According to a second aspect, there is provided a Li battery electrode having, provided over a current collector, a thin film including an active material capable of insertion and extraction of Li, wherein the thin film is split into columnar parts by cuts formed in the thickness direction thereof, and a bottom part of each of the columnar parts is in adhesion to the current collector. A gap is formed in the periphery of each columnar part, and the presence of the gap relaxes the stresses arising from the expansion and contraction of the thin film attendant on the charge-discharge cycles, whereby a stress leading to exfoliation of the active material thin film from the current collector can be restrained from being generated. Therefore, a good adhesion condition can be maintained between the bottom part of each columnar part and the current collector.

The structure in which the Si thin film is split into the columnar parts by the cuts formed therein promises an increased area of contact between the Si thin film and the electrolytic solution. In addition, it is considered that, since the columnar parts are formed in substantially equal sizes, the charge-discharge reactions attended by insertion and extraction of Li proceed efficiently in the active material thin film.

It is also considered that, since each of the columnar parts of the Si thin film is in adhesion to the current collector, the active material is electrically connected to the current collector in a good condition, so that the charge-discharge reactions can proceed efficiently. Besides, an upper part of each columnar part has a rounded shape, so that concentration of current will hardly occur; in this electrode structure, therefore, there is little possibility of a dendritic Li metal deposition reaction or the like.

It is considered that, even when the Si thin film split into the columnar parts is subjected to charge-discharge cycles, the stresses arising from the expansion and contraction of the active material are relaxed by the presence of the gaps formed in the peripheries of the columnar parts, so that the charge-discharge cycle can be repeated without bringing about exfoliation of the active material from the current collector.

According to the first and second aspect, it is possible to obtain a lithium secondary battery with a high charge/discharge capacity and exbatteryent charge-discharge cycle characteristics.

Patent Document 4 (set forth later) with the title "Negative Electrode and Battery Using the Same" contains the following description.

A negative electrode includes a negative electrode active material layer having pluralities of first layers and second layers laminated alternately, the first and second layers containing Si and differing from each other in oxygen (O) content. According to the negative electrode and a battery using the negative electrode, it is possible to restrain severe expansion and contraction of the negative electrode active material layer and to restrain structural breakdown of the negative electrode active material layer. Further, this can reduce in reactivity in negative electrode active material layer and electrolyte. Therefore, cycle characteristics can be enhanced, and practical cycle characteristics can be obtained even when the thickness of the negative electrode active material layer is brought to a practical level.

Patent Document 5 (set forth later) with the title "Method of Manufacturing Electrode for Lithium Secondary Battery" contains the description of a method of forming an active material layer over a current collector by use of an electrode forming device based on a vapor deposition process.

[Patent Document 1]
Japanese Patent Laid-open No. Hei 8-50922 (paragraphs 0011-0014 and 0017-0018; FIGS. 2 and 3)

[Patent Document 2]
Japanese Patent Laid-open No. Hei 11-135115 (paragraphs 0004-0005)

[Patent Document 3]
Japanese Patent Laid-open No. 2002-83594 (paragraphs 0006, 0008, 0020, 0022, 0185 and 0350)

[Patent Document 4]
Japanese Patent Laid-open No. 2004-349162 (paragraphs 0006-0008 and 0067; FIGS. 1 to 3)

[Patent Document 5]
Japanese Patent Laid-open No. 2005-158633 (paragraphs 0041-0044; FIGS. 4 to 5)

In recent years, vigorous investigations have been made on enhancement of the capacity of Li ion secondary batteries in which Si, Sn or the like material capable of alloying with Li is used as a negative electrode active material. For example, in the case where Si is used, an enhanced capacity is obtained, but the negative electrode would be broken due to the expansion and contraction attendant on the charge and discharge, leading to worsening of charge-discharge cycle characteristics.

Thus, where Si or Sn is used as the negative electrode active material, the expansion and contraction of the negative electrode active material layer arising from the repeated charging and discharging are so large that the negative electrode active material layer may be crushed and pulverized or may come off from the negative electrode current collector, leading to a deteriorated current collecting ability, a lowered charge/discharge capacity, a lowered load characteristic, or lowered charge-discharge cycle characteristics.

As compared with a negative electrode having a negative electrode active material layer formed over a negative electrode current collector from a negative electrode active material by a sintering method using a binder, a coating method or the like method, a negative electrode having a negative electrode active material layer formed by vapor-phase growth does not have a path for insertion/release of Li ions, so that it involves the problems that charge and discharge will not proceed uniformly, that the expansion and contraction of the negative electrode active material layer cannot be relaxed, and so on.

Patent Document 3 contains the description of an active material thin layer comprised of columnar bodies, but there is no sufficient consideration of how to make charge and discharge proceed uniformly. In order to realize an enhanced capacity and to enhance the load characteristic and charge-discharge cycle characteristics, it is important to secure uniform progress of the charge and discharge in the negative electrode active material layer, and a technology for realizing this is being demanded.

SUMMARY

Thus, there is a need for a negative electrode which makes it possible to realize an enhanced capacity, to moderate the influence of the stresses generated in a negative electrode active material layer due to charge and discharge, and to further enhance load characteristics and charge-discharge cycle characteristics. There is also a need to provide a battery using the negative electrode, and a method of manufacturing such a negative electrode.

According to an embodiment, there is provided a negative electrode including a negative electrode current collector, and a negative electrode active material layer formed over the negative electrode current collector, wherein an organic material layer having ion conductivity is held by the negative electrode active material layer.

According to another embodiment, there is provided a battery including the just-mentioned negative electrode.

According to a further embodiment, there is provided a method of manufacturing a negative electrode which includes a negative electrode current collector and a negative electrode active material layer formed over the negative electrode current collector and including a plurality of columnar bodies, the method including: a first step of forming an active material layer over the negative electrode current collector; and a second step of holding by the active material layer an organic material layer having ion conductivity, wherein the negative electrode active material layer is formed to include the active material layer and the organic material layer.

In accordance with the negative electrode and the battery based on the embodiment, the organic material layer having ion conductivity is held by the negative electrode active material layer. Therefore, it is possible to increase the area of contact between metal ions and the negative electrode active material, and to realize an enhanced capacity. In addition, it is possible to suppress by the organic material layer the influences of the stresses generated in the negative electrode active material layer due to the charge and discharge (deterioration of current collecting ability, a lowering in charge/discharge capacity, a lowering in load characteristic, a lowering in charge-discharge cycle characteristics, etc. due to crushing and/or pulverization of the negative electrode active material layer, coming-off of the negative electrode active material layer from the negative current collector, etc. arising from the expansion and contraction of the negative electrode active material attendant on the charge and discharge), and to further enhance the load characteristic and charge-discharge cycle characteristics.

Besides, in accordance with the method of manufacturing a negative electrode based on the embodiment, the active material layer is formed over the negative electrode current collector, and the organic material layer having ion conductivity is held by the active material layer, to thereby form the negative electrode active material layer. Therefore, it is possible to provide a negative electrode such that the influences of the stresses generated in the negative electrode active material layer due to the charge and discharge can be suppressed, and the load characteristic and charge-discharge cycle characteristics can be further enhanced.

Additional features and advantages are described herein, and will be apparent from, the following Detailed Description and the figures.

DETAILED DESCRIPTION

In the negative electrode and the battery based on an embodiment, preferably, the organic material layer is formed inside the negative electrode active material layer in the state of making contact with the outside (in the condition where the organic material layer is exposed to the electrolytic solution side) at least at a part of the negative electrode active material layer. Since the organic material layer having ion conductivity is formed inside the negative electrode active material layer in the slate of making contact with the outside (in the condition where the organic material layer is exposed to the electrolytic solution side) at least at a part of the negative electrode active material layer, the organic material layer is in contact with the negative electrode active material, metal ions occluded into and released from the surface of the negative electrode active material layer can utilize the newly provided metal ion insertion/release path through the organic material layer, whereby the ion passage can be enlarged, and the area of contact between the metal ions and the negative electrode active material can be increased. As a result, a more inner part of the negative electrode active material layer can also contribute to the charge-discharge reactions, and the insertion and release of the metal ions into and from the negative electrode active material can be made to proceed uniformly. In the case where the organic material layer is in contact with the electrolytic solution, the metal ion insertion/release path through the organic material layer is further enlarged. As a result, the charge and discharge with high capacity and the attendant expansion and contraction of the negative electrode active material layer are made more uniform, the slip and/or collapse of the negative electrode active material layer during charge-discharge cycles can be prevented, and load characteristics and charge-discharge cycle characteristics can be further enhanced. Representative examples of the metal ion include the Li ion.

In addition, preferably, the negative electrode active material layer includes a plurality of columnar bodies, and the organic material layer is formed inside the columnar bodies in the condition where at least a part thereof makes contact with the outside (in the condition where the organic material layer is exposed to the electrolytic solution side). Since the negative electrode active material layer includes a plurality of columnar bodies, the organic material layer is formed inside the columnar bodies in the condition where at least a part thereof makes contact with the outside (in the condition where the organic material layer is exposed to the electrolytic solution side), and the organic material layer is in contact with the negative electrode active material, it is possible to enlarge the area of contact between the metal ions and the negative electrode active material through the organic material layer. As a result, a more inner part of the negative electrode active material layer can also contribute to the charge-discharge reactions, the insertion and release of the metal ions into and from the negative electrode active material can be made to proceed uniformly, and the expansion and contraction of the negative electrode active material layer attendant on the charge, and discharge can be made more uniform. In addition, due to the presence of the organic material layer inside the columnar bodies, the stresses generated in the negative electrode active material layer attendant on the charge and discharge can be relaxed. As a result, charge and discharge with high capacity can be achieved, the attendant expansion and contraction of the negative electrode active material layer can be made more uniform, slip and/or collapse of the negative electrode active material layer during charge-discharge cycles can be prevented from occurring, and load characteristics and charge-discharge cycle characteristics can be further enhanced.

Preferably, the columnar bodies each include a plurality of thin film layers formed from an active material capable of insertion and release of metal ions, and the organic material layer is formed between the thin film layers. Since the thin film layers and the organic material layers are formed alternately so as to obtain a configuration in which the organic material layer makes contact with the active material, the insertion and release of the metal ions into and from the active material can be made to proceed uniformly, and the expansion and contraction attendant on the charge and discharge can be made more uniform. Accordingly, it is possible to obtain an enhanced capacity, and to further enhance load characteristics and charge-discharge characteristics.

Preferably, the active material include Si or a compound of Si. By forming the columnar bodies including Si or a compound of Si by vapor deposition, it is possible to increase the charge/discharge capacity.

In addition, preferably, the organic material layer includes a reduction decomposition product of an electrolytic solution. A reduction decomposition product of an electrolytic solution which is the same as the electrolytic solution used in a battery using the negative electrode is used to form the organic material layer, so that the charge and discharge can be made to proceed uniformly and high load characteristics can be realized, without lowering the battery capacity.

Besides, preferably, the electrolytic solution includes an aprotic organic solvent, and the aprotic organic solvent is at least one solvent selected from oxygen-containing solvents, sulfur-containing solvents, and fluorine-containing solvents.

In addition, preferably, the electrolytic solution includes an aprotic organic solvent, and the aprotic organic solvent has at least one of a functional group C=O, a functional group S=O, and a functional group F.

Besides, preferably, the electrolytic solution includes an aprotic organic solvent, and the aprotic organic solvent is a cyclic or chain carbonic acid ester of which hydrogen is at least partly fluorinated.

With each of the above-mentioned configurations adopted as to the electrolytic solution including the aprotic organic solvent, it is possible to enhance the charge/discharge capacity and to further enhance load characteristics and charge-discharge cycle characteristics.

In addition, preferably, an element constituting the negative electrode current collector is alloyed with an element constituting the columnar bodies or is diffused in the columnar bodies. With the diffusion, the negative electrode current collector and the columnar bodies are integrated with each other with sufficient strength, so that even upon expansion and contraction of the columnar bodies and, hence, the negative electrode active material layer attendant on the charge and discharge, the negative electrode active material can be restrained from dropping out of the negative electrode current collector. Therefore, it is possible to enhance the charge/discharge capacity and to further enhance load characteristics and charge-discharge cycle characteristics.

Besides, preferably, the negative electrode current collector has a surface roughness (Rz (ten-point mean roughness)) of 1.8 to 4.8 µm. With the surface roughness (Rz) of the negative electrode current collector set in the range of 1.8 to 4.8 µm, the presence of the organic material layer formed inside the columnar bodies formed over the negative electrode current collector ensures that the stresses generated attendant on the expansion and contraction of the columnar bodies and, hence, the negative electrode active material layer attendant on the charge and discharge can be relaxed, and it is possible to enhance the charge/discharge capacity and to further enhance load characteristics and charge-discharge cycle characteristics.

Further, preferably, the negative electrode current collector has a surface roughness (Rz) of 2.0 to 4.5 µm. With the surface roughness (Rz) of the negative electrode current collector set in the range of 2.0 to 4.5 µm, the presence of the organic material layer formed inside the columnar bodies formed over the negative electrode current collector ensures that the above-mentioned stresses can be relaxed more effectively, and it is possible to enhance the charge/discharge capacity and to further enhance load characteristics and charge-discharge cycle characteristics.

In the method of manufacturing a negative electrode based on the embodiment, preferably, the organic material layer is held by the active material layer by a wet system in the above-mentioned second step. Since the organic material layer is held by the active material layer by the wet system, the organic material layer can be held by the negative electrode active material layer by, for example, a wet treatment using an electrolytic solution the same as the electrolytic solution used in the battery using the negative electrode or by a wet treatment based on a coating method or the like, and, as a result, it is possible to provide a negative electrode such that the charge and discharge can be made to proceed uniformly and high load characteristics can be realized, without lowering the battery capacity.

In addition, preferably, the method further includes a third step of forming the active material layer over the organic material layer, and the second and third steps are repeated alternately. With the second and third steps repeated alternately, the negative electrode active material layer can be formed to have a structure having the organic material layer and the active material layer in contact with each other and to have a desired thickness, whereby it is possible to enhance the charge/discharge capacity and further enhance load characteristics and charge-discharge cycle characteristics.

Now, embodiments will be described in detail below, referring to the drawings. In this embodiment, a negative electrode in which negative electrode active material layer containing Si as a negative electrode active material permitting insertion therein and release therefrom of Li ions is formed over a negative electrode current collector is taken as an example of the negative electrode in which the negative electrode active material layer containing a negative electrode active material permitting insertion therein and release therefrom of Li ions, and the negative electrode as well as an example in which a Li ion secondary battery is configured by use of the negative electrode will be described.

In this embodiment, the negative electrode active material layer is formed over the negative electrode current collector by use of a group of Si-containing columnar bodies. In each of the columnar bodies, Si layers and organic material layers are alternately formed so that the organic material layer having ion conductivity and the Si layer make contact with each other, an discontinuous part of each of the organic material layers is filled up with Si, and the strength of the columnar bodies is maintained by the communicating Si.

The presence of the organic material layer included in each of the columnar bodies can enlarge the area of contact between Li ion and Si, whereby an enhanced capacity can be realized, the stresses generated in the negative electrode active material layer attendant on the charge and discharge can be relaxed, and load characteristics and charge-discharge cycle characteristics can be further enhanced.

Since the organic material layer has Li ion conductivity, the provision of the organic material layer in the negative electrode active material layer results in that insertion and release of Li ions into and from Si present in the inside of the negative electrode active material layer is further generated through the organic material layer in addition to the insertion and release of Li ions into and from Si through the outside surface of the negative electrode active material layer, which means that a path for insertion and release of Li ions into and from Si is newly provided. Therefore, the area of contact between the Li ions and the negative electrode active material (Si) can be enlarged, a more inner part of the negative electrode active material layer contributes to the charge-discharge reactions, and the insertion and release of Li ions into and from Si are made to proceed uniformly.

As a result, charge and discharge with high capacity can be achieved, the attendant expansion and contraction of the negative electrode active material layer are made to proceed more uniformly, the slip and/or collapse of the negative electrode active material layer during charge-discharge cycles can be prevented, and load characteristics and charge-discharge cycle characteristics can be enhanced more, whereby a negative electrode with high operation stability can be obtained.

Incidentally, in the case where the organic material layer is formed from an organic material contained in the electrolytic solution used in the battery using the negative electrode or formed from a reduction decomposition product of the organic material, it is possible to make charge and discharge proceed uniformly and to realize high load characteristics without lowering the battery capacity.

First, the configuration of a negative electrode according to a first embodiment will be described.

First Embodiment

Figure 1A:
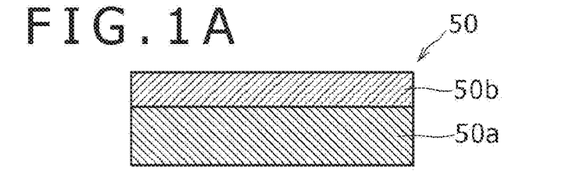
FIGS. 1A to 1C show a configuration example of a negative electrode, in a first embodiment.
Figure 1B:
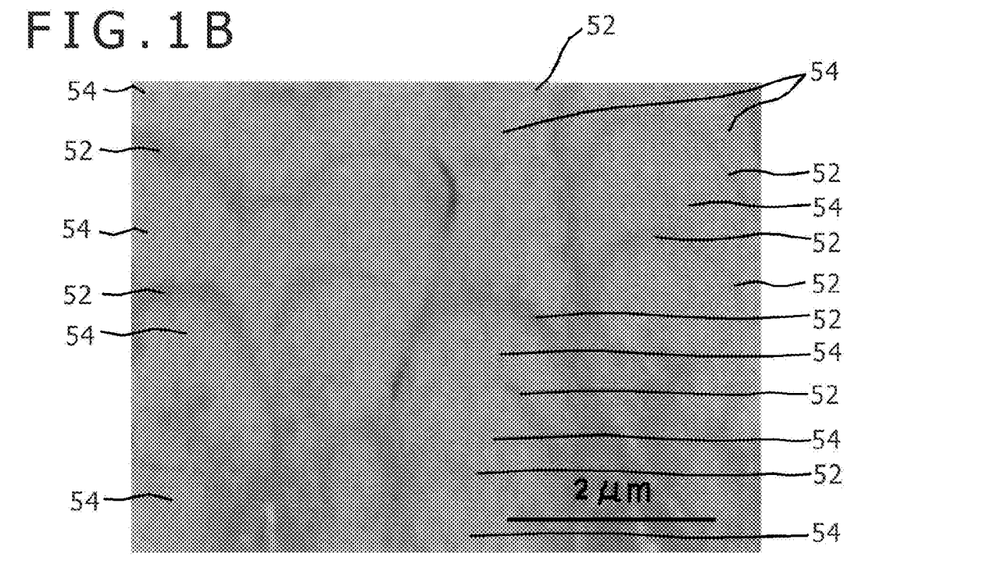
Figure 1C:
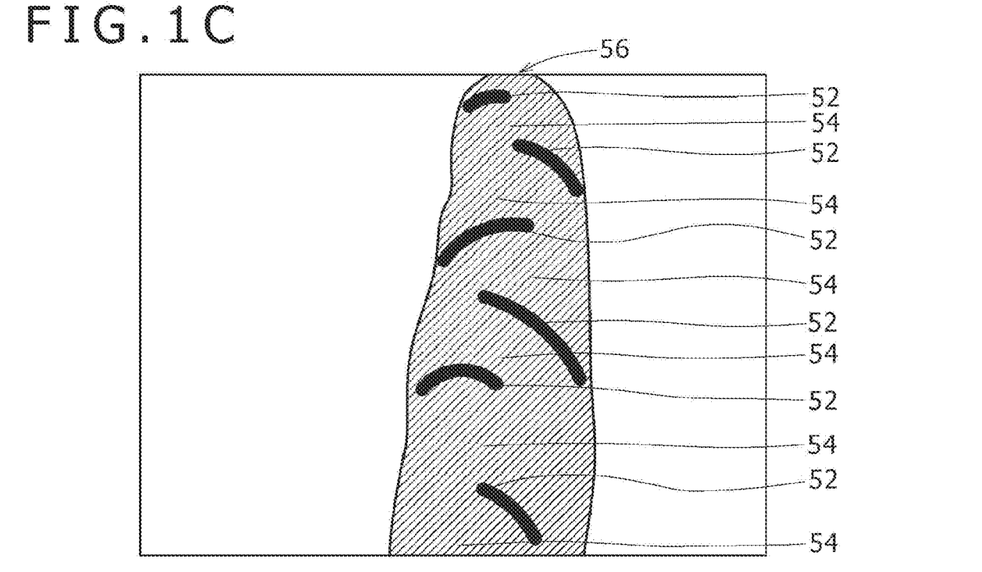

FIGS. 1A to 1C show a configuration example of a negative electrode in the first embodiment, in which FIG. 1A is a sectional view showing the configuration of the negative electrode, FIG. 1B is a scanning electron microphotograph showing the sectional structure of the negative electrode, showing the configuration of a negative electrode active material layer, and FIG. 1C is a sectional view of a part of FIG. 1B, schematically showing characteristic parts. Incidentally, FIG. 1B shows an example of the section along a plane perpendicular to the planes of the negative electrode current collector, and shows the condition before assemblage of the negative electrode into the battery, i.e., the condition of the negative electrode before charge and discharge. FIG. 1C illustrates the characteristic features of the columnar body 56, and is a sectional view schematically showing the characteristic parts of the columnar body by taking out a part of FIG. 1B.

As shown in FIG. 1A, the negative electrode 50 has a negative electrode current collector 50a, and a negative electrode active material layer 50b which is provided over the negative electrode current collector 50a and which contains Si. The negative electrode current collector 50a, preferably, contains an element which can form an alloy with Si; for example, the negative electrode current collector 50a includes copper (Cu). As will be described later, the negative electrode active material layer 50b show large expansion and contraction attendant on charge and discharge because it contains Si, but when the negative electrode active material layer 50b is firmly integrated with the negative electrode current collector 50a through alloying, the negative electrode active material layer 50b can be restrained from coming off from the negative electrode current collector 50a.

As shown in FIGS. 1B and 1C, the negative electrode active material layer 50b formed over the negative electrode current collector 50a includes a plurality of columnar bodies 56 formed in columnar shapes from Si, as though corn seeds are grown on the plane of the negative electrode current collector 50a. Each of the columnar bodies 56 includes pluralities of Si layers 54 and organic material layers 52.

The columnar body 56 includes the pluralities of Si layers 54 and organic material layers 52; specifically, it includes Si regions having continuous Si parts in which the Si layers 54 are formed in succession in the formation direction and directly connected to each other, and organic material layer regions having continuous organic material parts in which the organic material layers 52 are formed in succession in the formation direction and directly connected to each other. The Si regions in which the plurality of Si layers 54 are directly connected to each other ensures that the columnar bodies 56 are integrated, and the strength of the negative electrode active material layer 50b is maintained.

Thus, the negative electrode active material layer 50b includes a plurality of columnar bodies 56, and each of the columnar bodies 56 includes the plurality of Si layers 54, and the organic material layers 52 each formed between the Si layers 54 and making contact with the Si layers 54. As will be described later, after each of the Si layers 54 is formed, the thus formed Si layer 54 is immersed in an electrolytic solution, for example, one which has the same composition as the electrolytic solution (containing an organic solvent and an electrolyte salt) used in the battery using the negative electrode according to this embodiment, whereby the organic material layer 52 is formed from a reduction decomposition product of the electrolytic solution.

Each of the columnar bodies 56 of the negative electrode active material layer 50b is formed by alternate lamination of the Si layers 54 and the organic material layers 52 in this order from the side of the negative electrode current collector 50a, with the Si layer 54 or the organic material layer 52 being formed as the uppermost layer. The organic material layers 52 have Li ion conductivity, and serve as paths for migration of Li ions, so that the insertion and release of Li ions will proceed uniformly throughout the negative electrode active material layer 50b.

The columnar bodies 56 are formed substantially orthogonally to the plane of the negative electrode current collector 50a in the state of being grouped while being mutually separated at substantially constant intervals, and include those which are integrated through connection of parts of the columnar bodies 56. The organic material layers 52 present intermediately between the Si layers in the columnar bodies 56 function also to relax the stresses generated due to the expansion and contraction attendant on charge and discharge, whereby the expansion and contraction attendant on the charge and discharge can be restrained, so that the negative electrode 50 can be restrained from structural breakdown.

The thickness of the negative electrode active layer 50b, for example in the discharged condition, is preferably not less than 4 μm, which is a practical thickness. When the thickness is not less than 4 μm, the effect of alternate lamination of the Si layers 54 and the organic material layers 52 is displayed more conspicuously. The columnar bodies 56, for example, have a height of 6 μm, and a mean diameter of 2 to 3 μm, and the mean thickness of the organic material layer 52 is preferably not more than 0.5 μm. If the organic material layer 52 is too thick, the electron conductivity of the negative electrode active material layer 50b as a whole may be lowered, or the overall capacity may be lowered. Incidentally, the diameter of the columnar bodies 56 and the like vary depending on the material and surface roughness of the negative electrode current collector 50a.

In addition, the interval of the organic material layers 52 in the columnar body 56 is preferably not more than 2 μm. If the interval is too large, it may be impossible to obtain sufficient Li ion paths, and a sufficient expansion and contraction restraining performance cannot be expected because the expansion and contraction due to the reaction between Li ions and Si are enlarged.

The Si layers 54 in the negative electrode active material 50b are preferably formed by a vapor deposition method, for example. With this configuration, structural breakdown due to expansion and contraction of the negative electrode active material 50b attendant on the charge and discharge can be restrained, the negative electrode current collector 50a and the negative electrode active material layer 50b can be integrated, and the electron conductivity in the negative electrode 50 can be enhanced. In addition, this configuration makes it possible to form a negative electrode current collector 50a reduced in thickness by controlling the thicknesses of the Si layers 54 and the organic material layers 52.

In addition, the Si layer 54 in the negative electrode active material layer 50b, preferably, is alloyed with the negative electrode current collector 50a at least at a part of the interface between itself and the negative electrode current collector 50a. Specifically, it is preferable that at the interface, a constituent element of the negative electrode current collector 50a has been diffused into the Si layer 54, or a constituent element of the Si layers 54 has been diffused into the negative electrode current collector 50a, or the constituent elements of the layers have been mutually diffused. This alloying is in many cases effected simultaneously with the formation of the negative electrode active material layer 50b by a vapor deposition method, but may be effected by a further heat treatment.

Incidentally, the above-mentioned element diffusion is included herein as one mode of alloying.

Now, a specific method of manufacturing the negative electrode 50 will be described below.

Figure 2:
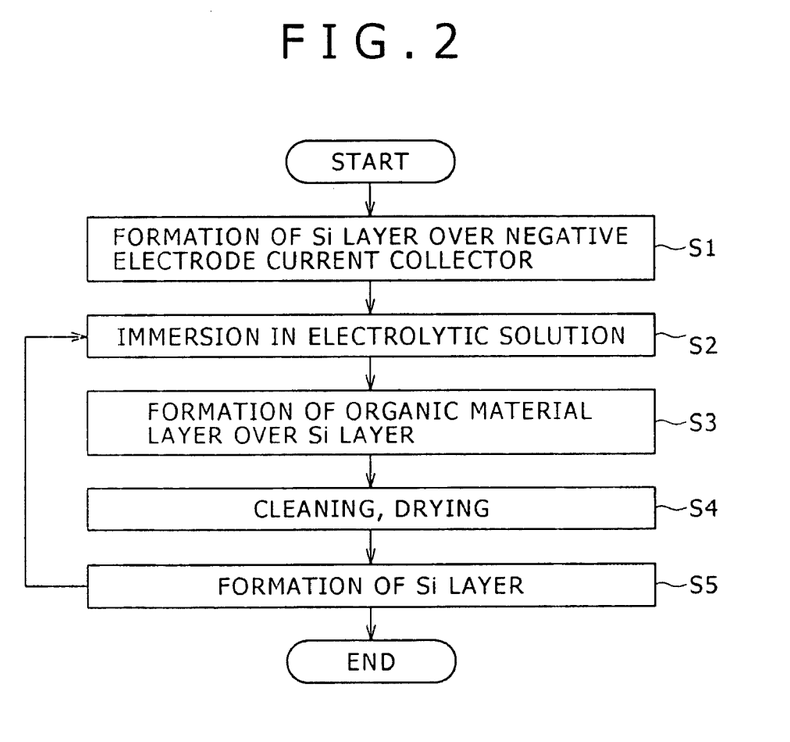
FIG. 2 shows an example of the manufacturing process of the negative electrode in the first embodiment.

FIG. 2 shows an example of the manufacturing process of the negative electrode 50, in the first embodiment. Now, each of the steps shown in FIG. 2 will be described below.

Step S1: Formation of Si Layer 54 Over Negative Electrode Current Collector 50a

By use of a negative electrode active material layer forming device 1 (FIG. 3A) which will be described later, a Si layer 54 is formed over a negative electrode current collector 50a. Incidentally, details of the formation of the Si layer 54 will be described later.

Step S2: Immersion in Electrolytic Solution

The negative electrode current collector 50a with the Si layer 54 formed thereover in Step S1 is taken out of the negative electrode active material layer forming device 1, and is immersed in an electrolytic solution. The electrolytic solution has the same composition as that of the electrolytic solution (containing an organic solvent and an electrolyte salt) used in the battery (described later) using the negative electrode 50 according to this embodiment.

Step S3: Formation of Organic Material Layer 52 Over Si Layer 54

By use of an organic material laser forming device 16 (FIG. 3B) which will be described later, a reduction decomposition product of the electrolytic solution is deposited on Si 52, to form an organic material layer 52. Incidentally, details of Steps S2 and S3 will be described later.

Step S4: Cleaning, Drying

After the reaction in Step S3 is over, cleaning and drying are carried out.

Step S5: Formation of Si Layer 54

The negative electrode current collector 50a with the organic material layer 52 formed over the Si layer 54 is set in the negative electrode active material layer forming device 1 which will be described later, and a Si layer 54 is formed over the organic material layer 52.

Returning to Step S2, Steps S2 to S5 are repeated until a desired number of Si layers 54 are formed.

The thicknesses of the Si layers 54 formed in Step S1 and Step S5 and the thickness of the organic material layer 52 formed in Step S3 are controlled according to the number of the Si layers 54 to be formed, whereby a negative electrode active material layer 50b which has a desired number of the Si layers 54 and the organic material layers 52 formed between the Si layers 54 and which has the organic material layer(s) 52 in contact with the Si layer(s) can be formed in a desired thickness on the negative electrode current collector 50a.

As has been above-described, the negative electrode active material layer 50b including the Si layers 54 and the organic material layers 52 and having a desired thickness is formed over the negative electrode current collector 50a, whereby the negative electrode 50 is fabricated.

Incidentally, the negative electrode active material layer 50b may naturally be formed on one side or both sides of the negative electrode current collector 50a. In the case of forming the negative electrode active material layer 50b on each of both sides of the negative electrode current collector 50a, for example, first, the negative electrode active material layer 50b is formed on one side of the negative electrode current collector 50a, and, next, the negative electrode active material layer 50b is formed on the other side of the negative electrode current collector 50a. In the case where the negative electrode active material layer 50b is formed on both sides, the capacity of the negative electrode per unit area can be substantially doubled, as compared with the case where the negative electrode active material layer 50b is formed on only one side.

Now, details of the formation of the Si layer 54 in the negative electrode active material layer 50b constituting the negative electrode 50 will be described below. While the following description will be made by taking as an example the case of using a negative electrode active material layer forming device for forming the negative electrode active material layer 50b on both sides of a belt form negative electrode current collector 12, another method may be adopted in which the negative electrode active material layer 50b is formed over the whole area on one side of a belt form negative electrode current collector 12, and thereafter the negative electrode active material layer 50b is formed over the whole area on the other side of the belt form negative electrode current collector 12.

Figure 3A:
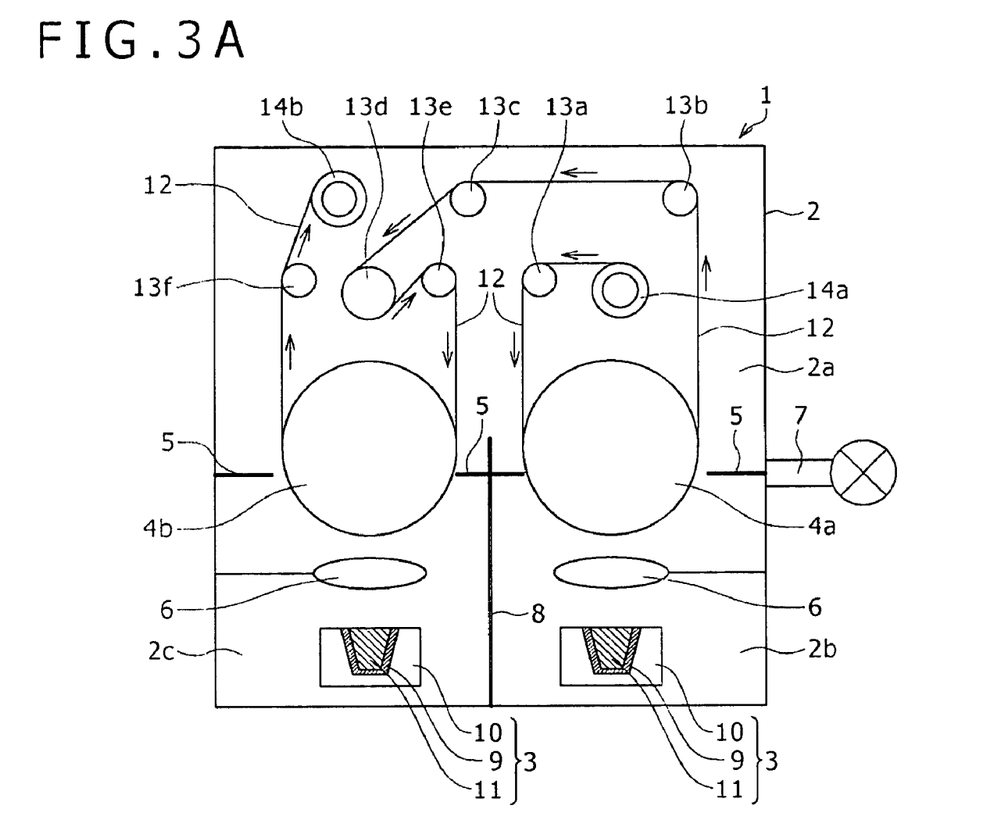
FIGS. 3A to 3B schematically illustrate the configuration of a negative electrode forming device in the first embodiment.
Figure 3B:
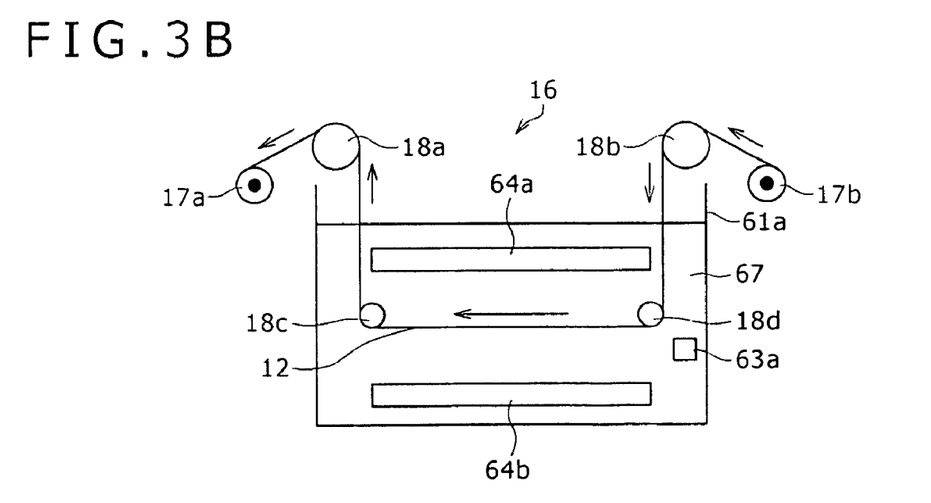

FIGS. 3A to 3B schematically illustrates the configuration of a negative electrode forming device in the first embodiment, in which FIG. 3A schematically shows a configuration example of the negative electrode active material layer forming device 1 used for forming the Si layers 54 constituting the negative electrode active material layer 50b, and FIG. 3B schematically shows a configuration example of an organic material layer forming device 16 for forming the organic material layers 52 constituting the negative electrode active material layer 50b.

The negative electrode active material layer forming device 1 shown in FIG. 3A is a vacuum evaporation device, which includes a vacuum chamber 2, vapor sources 3, circular can rolls 4a, 4b, a deposition preventive plate 5, shutters 6, and an evacuation device 7. In addition, guide rollers 13a, 13b, 13c, 13e, 13f, a feed roller 13d, and rollers 14a, 14b are provided to constitute a means for feeding the negative electrode current collector 12 including a belt form electrolytic copper foil or the like with or without the organic material layer 52 formed thereon (hereinafter referred to simply as the belt form negative electrode current collector 12) in its longitudinal direction.

The vacuum chamber 2 is partitioned by the deposition preventive plate 5 into a can roll installation chamber 2a and a vapor source installation chamber 2b, 2c, and the vapor source installation chambers 2b, 2c are partitioned from each other by a partition wall 8. The vapor sources 3 are installed in the vapor source installation chambers 2b, 2c, and the circular can rolls 4a, 4b are installed in the can roll installation chamber 2a at positions on the upper side of the vapor sources 3. The deposition preventive plate 5 is provided for blocking the heat and deposits generated from the vapor sources 3. The deposition preventive plate 5 is provided with openings for exposing the vapor deposition areas of the belt form negative electrode current collector 12, and the flows of vapor deposition materials in the vapor deposition areas are controlled by the shutters 6. In the vapor source installation chamber 2b, the Si layer 54 is formed on the vapor deposition area on one side of the belt form negative electrode, current collector 12, and, in the vapor source installation chamber 2c, the Si layer 54 is formed on the vapor deposition area on the other side of the belt form negative electrode current collector 12. The evacuation device 7 is so configured that the evacuation can be conducted to lower the pressure inside the chamber 2 to or below a desired pressure.

The vapor source 3 includes an electron gun not shown in FIG. 3A, a crucible 9 in which to put a vapor deposition material 11, a base 10 which is formed by use of carbon as a base material and on which to set the crucible 9, and the vapor deposition material 11. The electron gun has the function of evaporating the vapor deposition material 11 by heating it through irradiating it with an electron beam.

The belt form negative electrode current collector 12 is disposed in contact with the outer peripheral surfaces of the circular can rolls 4a, 4b, the guide rollers 13a, 13b, 13c, 13e, 13f, the feed roller 13d, and the rollers 14a, 14b, and the belt form negative electrode current collector 12 is paid off from the roller 14a on one end side thereof and fed along the directions of arrows in FIG. 3A, to be taken up onto the roller 14b. Arrows in FIG. 3A indicate the feed direction of the belt form negative electrode current collector 12. The circular can rolls 4a, 4b are so configured that the negative electrode current collector 12 can be cooled by passing water through the inside of the circular can rolls 4a, 4b.

In forming the Si layer 54 constituting the negative electrode active material layer 50b by use of the negative electrode active material layer forming device 1, first, the belt form negative electrode current collector 12 is disposed in contact with the outer peripheral surfaces of the circular can rolls 4a, 4b, the guide rollers 13a, 13b, 13c, 13e, 13f, the feed roller 13d, and the rollers 14a, 14b. In this case, the belt form negative electrode current collector 12 is connected to the roller 14b on one end side thereof, and is taken up onto the roller 14a on the other end side thereof. Of the belt form negative electrode current collector 12, the areas located at the openings in the deposition preventive plate 5 and exposed through the openings constitute the vapor deposition areas.

The vacuum chamber 2 is evacuated by the evacuation device 7, and, when the inside pressure is lowered to a desired objective pressure, the vapor materials 11 are heated by irradiation with electron beams in the condition where the shutters 6 are closed. Or, alternatively, the vapor materials 11 are heated in the condition where the shutters 6 are closed in accordance with the evacuation of the vacuum chamber 2, until the inside pressure is lowered to the desired objective pressure. Thereafter, the shutters 6 are opened, whereby the Si layer 54 is formed on the vapor deposition areas of the belt form negative electrode current collector 12.

Incidentally, the thickness of the Si layer 54 can be measured by a quartz resonator film thickness meter disposed in the vicinity of each of the vapor deposition areas.

In this manner, the formation of the Si layer 54 on the vapor deposition areas of the belt form negative electrode current collector 12 and the take-up of the belt form negative electrode current collector 12 in the direction of arrows shown in FIG. 3A are repeated, whereby the Si layers 54 can be formed on both sides of the belt form negative electrode current collector 12.

Incidentally, in the case of forming the negative electrode active material layer 50b on only one side of the negative electrode current collector 12, it suffices to keep one of the shutters 6 in the vapor source installation chambers 2b, 2c closed, during the above-described process.

While an example of forming the Si layer 54 by a vacuum evaporation method has been described referring to FIG. 3A, the method of forming the Si layer 54 is not particularly limited, and other method may also be used. Examples of the method usable include gaseous phase methods, baking methods, and liquid phase methods.

Examples of the gaseous phase methods include sputtering, ion plating, laser ablation, CVD (Chemical Vapor Deposition), and thermal spraying.

Examples of the liquid phase methods include plating (electroplating or electroless plating). Examples of sintering method include atmosphere sintering, reaction sintering, and hot pressing. Further, combinations of two or more of the above-mentioned methods or with other method may also be used for forming the Si layer 54.

In the case where the sputtering method is used, sputtering devices and the like are disposed in the vapor source installation chambers 2b, 2c shown in FIG. 3A, and targets composed of Si or the like are disposed in place of the vapor sources 3.

Incidentally, polygonal can rolls may also be used in place of the circular can rolls 4a, 4b shown in FIG. 3A. The polygonal can roll is a polygonal-section columnar can roll having a polygonal (for example, triangular, tetragonal, octagonal or the like) section, and it is so disposed that one of the side faces of the polygonal-section column is opposed to the front surface of the vapor source 3.

In addition, there are some cases where the characteristics can be further enhanced by effecting more alloying at the interface between the negative electrode current collector 12 and the Si layer 54, so that it is preferable to further conduct a heat treatment in a vacuum atmosphere or a non-oxidizing atmosphere, as required, thereby effecting more alloying at the interface between the negative electrode current collector 12 and the Si layer 54.

Now, details of a formation example of the organic material layer 52 over the Si layer 54 in Step S3 shown in FIG. 2 will be described below.

FIG. 3B schematically shows a configuration example of an organic layer forming device 16 for forming the organic material layer 52 over the Si layer 54 formed by the negative electrode active material layer forming device 1 shown in FIG. 3A, and the organic material layer 52 is formed laminatedly on the surface of the Si layer 54 by use of this device. Incidentally, the configuration and operation of the organic layer forming device 16 and details of the formation example of the negative electrode active material layer 50b will be described later (FIG. 4).

As shown in FIG 3B, the organic layer forming device 16 includes a reduction decomposition tank 61a filled up with an electrolytic solution 67, and three kinds of electrodes, i.e., a working electrode composed of the negative electrode 50, counter electrodes 64a, 64b opposed to the working electrode, and a reference electrode 63a, which are immersed in the electrolytic solution 67. The electrolytic solution 67 has the same composition as that of the electrolytic solution (containing an organic solvent and an electrolyte salt) used in the battery (described later) using the negative electrode 50 according to this embodiment.

The negative electrode current collector 12 (the negative electrode 50) taken up onto the roller 14b in the negative electrode active material layer forming device 1 and provided with the Si layers 54 on both sides thereof is paid off in the direction of arrow from a roller 17b through guide rollers 18a, 18b, 18c, 18d, the electrolytic solution 67 is subjected to reduction decomposition by a voltage impressed between the working electrode and the counter electrodes 64a, 64b, and a reduction decomposition product is deposited on the belt form negative electrode 50 to form the organic material layer 52. Thereafter, the negative electrode 50 is taken up onto a roller 17a after fed through cleaning and drying mechanisms (not shown).

Thus, the formation of the Si layer 54 by the negative electrode active material layer forming device 1 and the formation of the organic material layer 52 onto the Si layer 54 by the organic layer forming device 16 are repeated, whereby the negative electrode 50 having the organic material layers 52 each formed between the Si layers 54 stacked is formed.

Incidentally, the negative electrode active material layer forming device 1 and the organic layer forming device 16 may be operated independently from each other or operated in conjunction with each other. For example, the belt form negative electrode current collector 12 taken up on the roller 14b of the negative electrode active material layer forming device 1 and having the Si layers 54 formed on both sides thereof is taken out and loaded at the roller 17b of the organic layer forming device 16, and the organic material layers 52 are formed over the Si layers 54 on both sides of the belt form negative electrode current collector 12. The negative electrode current collector 12 thus provided with the organic material layers 52 and taken up onto the roller 17a is loaded at the roller 14a of the negative electrode active material layer forming device 1, and the Si layers 54 are formed over the organic material layers 52 on both sides of the belt form negative electrode current collector 12. In this manner, the Si layers 54 and the organic material layers 52 can be sequentially formed.

In addition, for example, a configuration in which the rollers 14a, 14b of the negative electrode active material layer forming device 1 are disposed in the outside of the vacuum chamber 2, the belt form negative electrode current collector 12 is fed into and out of the vacuum chamber 2 in such a manner as not to lower the degree of vacuum in the vacuum chamber 2, the negative electrode current collector 12 is paid off or taken up from or onto a single roller (common roller) used in common as the roller 14a and the roller 17b, a guide roller or rollers are provided between the roller 17a and the roller 14b, and the negative electrode current collector 12 is paid off or taken up from or onto the roller 17a or the roller 14b, can also be adopted, to continuously perform the formation of the Si layers 54 and the formation of the organic material layers 52, and to form the negative electrode active material layers 50b on both sides of the negative electrode current collector 12.

In this case, the negative electrode current collector 12 is disposed between the roller 14b and the roller 14a (common roller) in the manner of being paid off from the roller 14b, the belt form negative electrode current collector 12 is fed in the direction of arrows in FIG. 3A, the first-layer Si layers 54 are formed on the vapor deposition areas by the negative electrode active material layer forming device 1, subsequently the first-layer organic material layers 52 are formed over the first-layer Si layers 54 by the organic layer forming device 16, and the negative electrode current collector 12 is taken up onto the roller 17a.

The negative electrode current collector 12 thus obtained is paid off from the roller 17a toward the roller 14b, the second-layer Si layers 54 are formed on the vapor deposition areas by the negative electrode active material layer forming device 1, and then the second-layer organic material layers 52 are formed by the organic layer forming device 16. Subsequently, in a similar manner, pluralities of Si layers 54 and organic material layers 52 can be formed by continuous operations. Incidentally, in order to obtain a configuration in which the organic material layer 52 is not formed at the outermost layer of the negative electrode active material layer 50b, it suffices to omit the formation of the organic material layers 52 following to the formation of the last-layer Si layers 54.

Incidentally, in the case where the Si layers 54 are formed on only one side of the belt form negative electrode current collector 12, it suffices that only one of the counter electrodes 64a, 64b in the organic layer forming device 16 is operated.

Figure 4A:
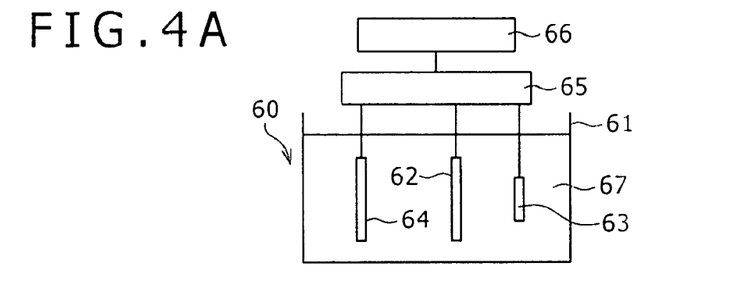
FIGS. 4A to 4B illustrate a formation example of an organic material layer constituting the negative electrode in the first embodiment.
Figure 4B:
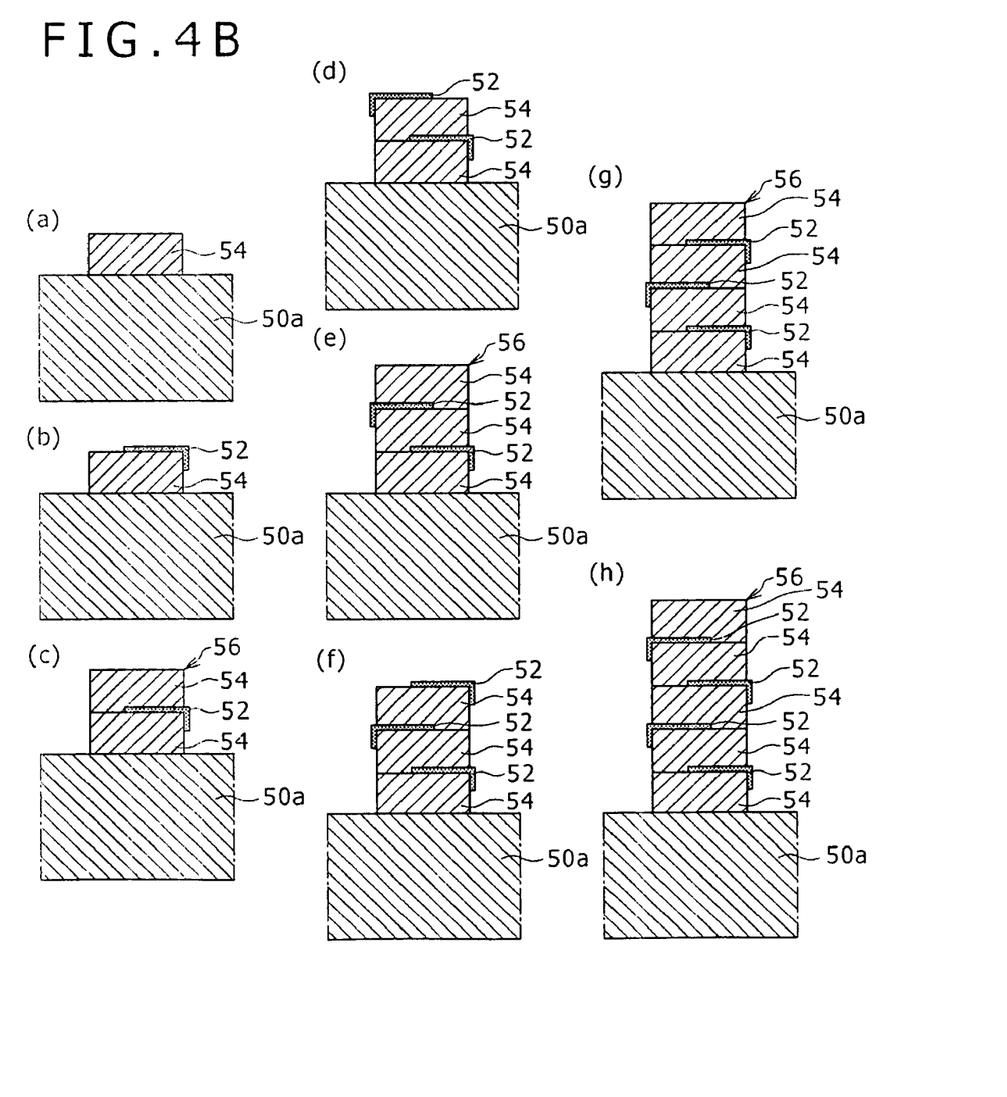

FIGS. 4A to 4B illustrate a formation example of the organic material layer 52 constituting the negative electrode active material layer 50b in the first embodiment. FIG. 4A illustrates the configuration and operation of a three-electrode battery 60 used in forming the organic material layers 52 constituting the negative electrode active material layer 50b by reduction decomposition of an electrolytic solution, and FIG. 4B shows sectional views for illustrating schematically a formation example of the negative electrode active material layer 50b including the organic material layer 52.

As shown in FIG. 4A, the three-electrode battery 60 includes a reduction decomposition tank 61 filled up with an electrolytic solution 67, and three electrodes, i.e., a working electrode 62, a reference electrode 63, and a counter electrode 64, which are immersed in the electrolytic solution 67. The three electrodes consisting of the working electrode 62, the reference electrode 63, and the counter electrode 64 are connected to a potentiostat 65, and the potentiostat 65 is controlled by a potential sweeper 66.

The negative electrode current collector 50a (12) provided with the Si layers 54 by Steps S1 and S5 shown in FIG. 2, as the working electrode 52, is immersed (Step S2 shown in FIG. 2) in the electrolytic solution 67 having the same composition as that of the electrolytic solution (containing an organic solvent and an electrolyte salt) used in the battery (described later) using the negative electrode 50 according to this embodiment. In the electrolytic solution 67 in the reduction decomposition tank 61, further, an aluminum (Al) plate serving as the counter electrode 64 and a SUS plate cladded with Li and serving as the reference electrode 63 are immersed, to constitute the three-electrode battery 60.

The three-electrode battery 60 is so configured that no current is passed through the reference electrode 63 and that a voltage is impressed between the working electrode 62 and the counter electrode 64 in such a manner as to bring the working electrode 62 to a desired voltage V with reference to the potential of the reference electrode 63.

By use of the potential sweeper 66, the potential of the working electrode 62 is swept in a base direction (in a direction for lowering the potential) at a rate of Vs=50 mV/sec, for example.

From the time point when the potential V of the working electrode 62 has just reached, for example, V=1.0 V with reference to the potential of the reference electrode 63, the potentiostat condition where the potential V of the working electrode 62 is kept at a constant value of 1.0 V is maintained for a time Tc, for example, 3 min.

During this, the electrolytic solution undergoes reduction decomposition by cathode polarization in the vicinity of the working electrode 62, whereon a reduction decomposition product having Li ion conductivity is deposited on Si 52, to form the organic material layers 52 on the Si layers 54 (Step S3 shown in FIG. 2).

The negative electrode active material layer 50b including the organic material layers 52 is formed as follows.

Sectional view (a) in FIG. 4B schematically shows the result of Step S1 shown in FIG. 2, showing the first-layer Si layer 54 formed in a layer composed of columnar bodies, on the negative electrode current collector 50a. In FIG. 4B, for simplification, a single columnar body 56 formed on the negative electrode current collector 50a is shown.

Sectional view (b) in FIG. 4B schematically shows the result of Step S3 shown in FIG. 2, showing the organic material layer 52 formed in a layer in contact with the surface of the first-layer Si layer 54 shown in sectional view (a) in FIG. 4B, by deposition of the reduction decomposition product of the electrolytic solution 67 onto the surface of the first-layer Si layer 54. In this sectional view (b), a left-side part of the columnar Si layer 54 is exposed to the outside.

Sectional view (c) in FIG. 4B schematically shows the result of Step S5 shown in FIG. 2, showing the second-layer Si layer 54 formed on the surface of the first-layer organic layer 52 shown in sectional view (b) in FIG. 4B. In this sectional view (c), Si is laminated on the upper surfaces of the columnar Si layer 54 and the organic material layer 52 shown in sectional view (b).

As shown in sectional view (c) in FIG. 4B, according to the negative electrode manufacturing steps shown in FIG. 2, the two Si layers 54, namely, the first-layer and second-layer Si layers 54 are provided, the organic material layer 52 is formed on the first-layer Si layer 54, and the organic material layer 52 is exposed at a side face of the columnar body 56, so as to be able to make contact with the electrolytic solution. The negative electrode active material layer 50b including a plurality of columnar bodies 56 is formed over the surface of the negative electrode current collector 50a, and, in each of the columnar bodies 56, the organic material layer 52 having ion conductivity is in contact with the electrolytic solution and the Si layer 54, so that the area of contact between the metal ions and the negative electrode active material is increased.

Subsequent to the condition shown in sectional view (c) in FIG. 4B, further. Steps S3 and S5 shown in FIG. 2 are repeatedly carried out, whereby the columnar bodies 56 each including two or more Si layers 54 and two or more organic material layers 52 are formed, and the negative electrode active material layer 50b including the plurality of columnar bodies 56 is formed over the surface of the negative electrode current collector 50a. Sectional view (e) in FIG. 4B shows an example in which the columnar body 56 includes three Si layers 54 and two organic material layers 52, sectional view (g) shows an example in which the columnar body 56 includes four Si layers 54 and three organic material layers 52, and sectional view (h) shows an example in which the columnar body 56 includes five Si layers 54 and four organic material layers 52. Sectional view (d) in FIG. 4B shows an example in which the second-layer organic material layer 52 is formed in a layer on the surface of the second-layer Si layer 54, and a right-side part of the columnar second-layer Si layer 54 is exposed to the outside. Sectional view (f) in FIG. 4B shows an example in which the third-layer organic material layer 52 is formed in a layer on the surface of the third-layer Si layer 54, and a left-side part of the columnar third-layer Si layer 54 is exposed to the outside.

As schematically shown in sectional views (b) to (h) in FIG. 4B, the organic material layer 52 is laminatedly formed in contact with the surface of the Si layer 54, and the Si layer is laminated directly on the surface of the Si layer 54 where the organic material layer 52 is not formed, so that the Si layers ranging through the connection of the regions where the organic material layer 52 is not formed constitute a communicating part.

Incidentally, while each of the pluralities of Si layers 54 and organic material layers 52 is formed in a simple shape such as a laminar shape in the examples shown in FIG. 4B as above-mentioned, in practice each of the pluralities of Si layers 54 and organic material layers 52 is laminatedly formed in a complicated shape as will be described below.

The negative electrode current collector 50a has a surface roughness in a predetermined range. For example, though detailed parts are not shown in sectional view (a) in FIG. 4B, the Si layer 54 formed on the surface of the negative electrode current collector 50a is formed in a shape influenced by the ruggedness of the negative electrode current collector 50a serving as a substrate, and is therefore formed to be nonuniform in thickness.

The lip surface of the columnar body 56 shows various shapes depending on the growth conditions, may have minutely rugged structure reflecting the local minutely rugged structures of the negative electrode current collector 50a serving as a substrate and of the Si layers 4 and the organic material layers 52 sequentially formed over the negative electrode current collector 50a, and varied depending on the growth conditions of the Si layers 54 and the organic material layers 52. Thus, the Si layers 54 and the organic material layers 52 are not always formed to be uniform in thickness.

For example, in the case where the organic material layer 52 formed on the previously formed Si layer 54 has an organic material layer lacking part which lacks the organic material layer 52 so that there is a Si layer exposing part where the previously formed Si layer 54 is exposed, formation of a new Si layer 54 on the organic material layer 52 results in that the new Si layer 54 is laminated continuously and directly on the Si layer exposing part. Besides, in the case where the Si layer 54 formed on the previously formed organic material layer 52 has a Si layer lacking part which lacks the Si layer 54 so that there is an organic material layer exposing part where the previously formed organic material layer 52 is exposed, formation of a new organic material layer 52 on the Si layer 54 results in that the new organic material layer 52 is laminated continuously and directly on the organic material layer exposing part.

Thus, there may be the case where the previously formed Si layer 54 and the newly formed Si layer 54 are continuous with each other, and the case where the previously formed organic material layer 52 and the newly formed organic material layer 52 are continuous with each other. In such cases, each of the pluralities of Si layers 54 and organic material layers 52 constituting the columnar bodies 56 is present in a laminar form in a complicated shape. The organic material layers 52 and Si layers 54 thus formed continuously are observed in FIGS. 1B and 1C shown above.

While an example in which the organic material layer 52 constituting the negative electrode active material layer 50b is formed by reduction decomposition of the electrolytic solution 67 has been described in the above description, the organic material layer 52 can also be formed by a method wherein, in Step S3 shown in FIG. 2, an organic material is applied to the surface of the Si layer 54 by a printing technique, a coating technique, or a spraying technique, followed by drying. In this case, Step S4 shown in FIG. 2 may be omitted.

Where the organic material layer 52 is formed by reduction decomposition of the electrolytic solution 67 in Step S3 shown in FIG. 2, the thickness of the organic material layer 52 is determined by the above-mentioned parameters (V, Tc) and/or the like. Therefore, by modifying such parameters, the organic material layer in a desired thickness can be formed over the Si layer 54.

For example, the thickness of the organic material layer 52 formed on the Si layer 54 is preferably in the range of 10 nm to 1 μm. This configuration makes it possible to suppress the above-mentioned influence of the stresses generated in the negative electrode active material layer attendant on the charge and discharge.

Now, a configuration example of the Li ion secondary battery using the negative electrode 50 according to the first embodiment will be described below.

Second Embodiment

A configuration example of the Li ion secondary battery in a second embodiment will be described below. Here, a Li ion secondary battery of the so-called rectangular type will be described.

Figure 5A:
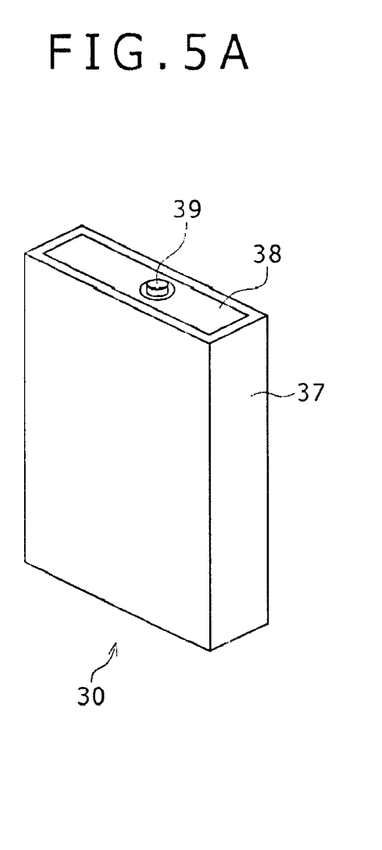
FIGS. 5A to 5B show a configuration example of a Li ion secondary battery, in a second embodiment.
Figure 5B:
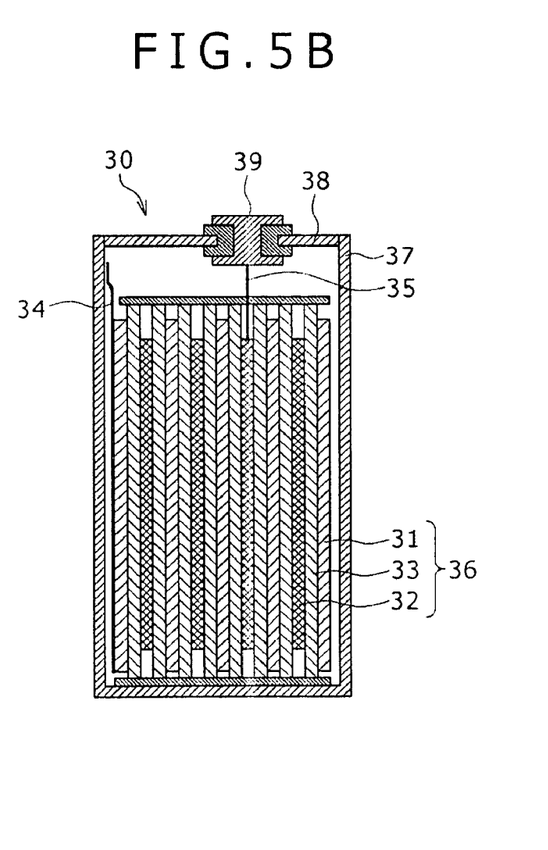

FIGS. 5A to 5B show a configuration example of the Li ion secondary battery according to the second embodiment, wherein FIG. 5A is a perspective view, and FIG. 5B is a sectional view.

As shown in FIGS. 5A and 5B, the Li ion secondary battery 30 is a rectangular type battery, wherein a rolled electrode body 36 is stored inside a battery can 37, and the battery can 37 is filled with an electrolytic solution. An opening of the battery can 37 is sealed with a battery cap 38. The rolled electrode body 36 has configuration in which a belt form negative electrode 31 and a belt form positive electrode 32 are opposed to each other, with a separator (and an electrolyte laser) 33 sandwiched therebetween, and the sandwich-like assembly is rolled (wound) along the longitudinal direction. A negative electrode lead 34 led out from the negative electrode 31 is connected to the battery can 37, and the battery can 37 serves also as a negative electrode terminal. A positive electrode lead 35 led out from the positive electrode 32 is connected to a positive electrode terminal 39.

Incidentally, the negative electrode active material lasers are formed respectively on both sides of the negative electrode current collector of the belt form negative electrode 31, and each of the negative electrode active material layers includes, for example, a group of columnar bodies 56 which are mutually separate at intervals and each of which is formed by laminating Si layers 54 and organic material lasers 52, as has been described in the first embodiment above.

Examples of the material usable for the battery can 37 and the battery cap 38 include iron (Fe), aluminum (Al), nickel (Ni), and SUS stainless steels.

The Li ion secondary battery 30 can be manufactured, for example, as follows.

First, as above-mentioned, the negative electrode 31 and the positive electrode 32 are produced. Next, the negative electrode 31 and the positive electrode 32 are made to face each other, with the separator 33 sandwiched therebetween, and the sandwich-like assembly is rolled (wound) along the longitudinal direction, to form a rolled electrode body 36. In this case, the negative electrode 31 and the positive electrode 32 are so disposed that the negative electrode active material layer and a positive electrode active material layer face each other.

Subsequently, the rolled electrode body 36 is inserted into the battery can 37 having a rectangular type shape, and the battery cap 38 is welded to the opening part of the battery can 37. Next, an electrolytic solution is fed into the battery can 37 through an electrolytic solution feed port formed in the battery cap 38, and the feed port is sealed off. In this manner, the rectangular type Li ion secondary battery 30 is assembled.

In addition, a vessel formed from an outer packaging material such as laminate film can also be used. A method may be used in which a polymerizable compound is fed into the vessel together with the electrolytic solution, and the polymerizable compound is polymerized in the vessel. Further, a method may be used in which prior to rolling the negative electrode 31 and the positive electrode 32, the negative electrode 31 or the positive electrode 32 is coated with a gel form electrolyte by a coating technique or the like, and then the set of the negative electrode 31 and the positive electrode 32 with the separator 33 sandwiched therebetween is rolled (wound).

Since simple material of Si or its compound or the like is contained as the negative electrode active material in the negative electrode active material layer in the Li ion secondary battery 30, the Li ion secondary battery can have an enhanced capacity. Moreover, the negative electrode according to the first embodiment has the above-mentioned structural features based on the manufacturing method thereof, so that structural breakdown the electrode (negative electrode) will hardly occur upon expansion of the negative electrode active material layer at the time of charging. Therefore, the Li ion secondary battery 30 is exbatteryent in load characteristics and in cycle characteristics such as capacity retention factor.

Now, details of specified examples of the embodiment will be described. Incidentally, in the description of the examples below, the reference symbols and other symbols used in the embodiments above will be used as they are in a corresponding manner.

Figure 6A:
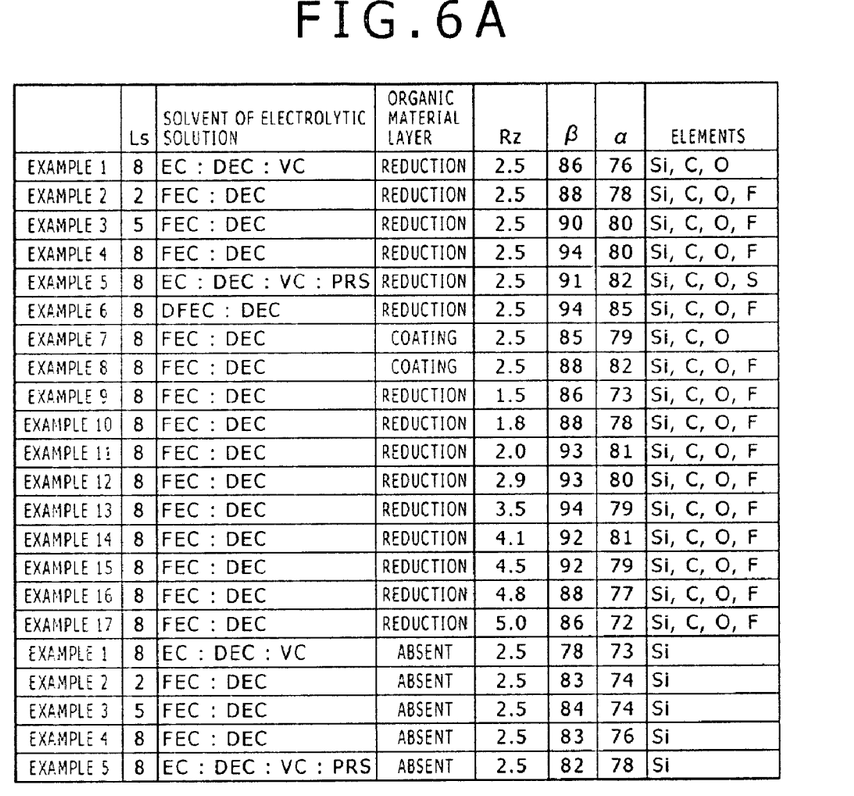
FIGS. 6A to 6B illustrate the outlines of Examples of the embodiment and Comparative Examples.
Figure 6B:
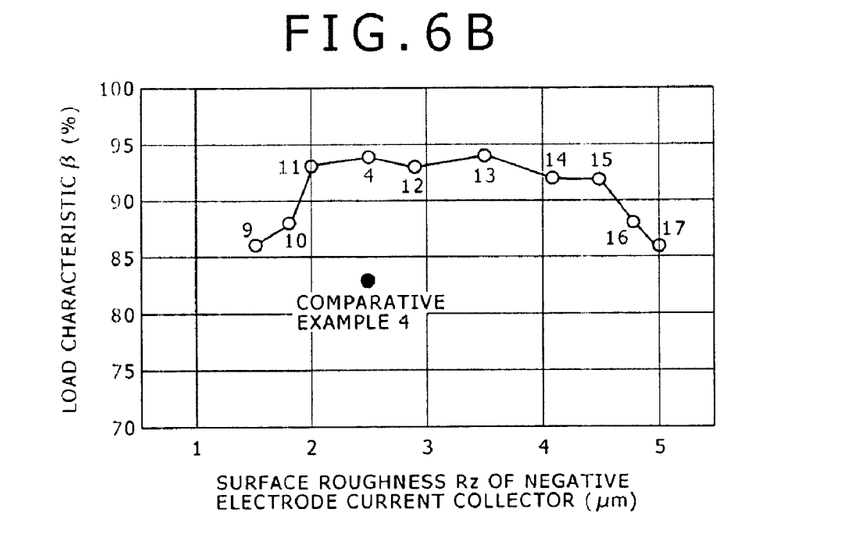

FIGS. 6A to 6B show outlines of the examples of the embodiment, in which FIG. 6A shows the general configurations and performances of negative electrodes and Li ion secondary batteries, and FIG. 6B is a diagram showing the relationship between the surface roughness of the negative electrode current collector and load characteristic.

In FIG. 6A, Ls denotes the number of Si layers 54 formed in the negative electrode current collector 12, Rz is the surface roughness Rz (μm) of the negative electrode current collector 12, α is the capacity retention factor (%) expressing the charge-discharge characteristic, and β is the load characteristic (%).

In addition, the column of "Organic Material Layer" indicates that the organic material layer 52 is formed by reduction or by coating. "Reduction" means formation of the organic material layer 52 by reduction decomposition, while "Coating" means formation of the organic material layer 52 by application of an organic material to the Si layer 54 and drying. The organic material layer 52 is formed in the Li ion secondary batteries of Examples 1 to 17, but is not formed in the Li ion secondary batteries of Comparative Examples 1 to 5.

Besides, the column of "Elements" shows the results of elemental analysis at the part between the Si layers 54, conducted by energy dispersive X-ray analysis (EDX) (hereinafter abridged to analysis by SEM-EDX).

In FIG. 6B, Ls=8, examples in which the solvents of the electrolytic solutions are the same (FEC:DEC (hereinafter ":" indicates that, for example, FEC and DFC constitute a mixed solvent)) are plotted together with the Example No., the results of Examples 4 and 9 to 17 are represented by blank circles, which are connected by solid line, and the results of Comparative Example 4 is represented by a solid circle. It is clear that the load characteristic β obtained in Comparative Example 4 did not reach the level of the load characteristics β obtained in Examples 9 to 17.

In the examples which will be described below, a Cu foil was used as the belt form negative electrode current collector 12, and single crystal Si as the negative electrode active material 50b was vapor deposited thereon to form a Si layer 54, thereby fabricating the negative electrode 50. As shown in FIG. 6A, in Examples 1 to 17 and Comparative Examples 1 to 5, each of the negative electrode active material layers 50 formed respectively on both sides of the negative electrode current collector 12 includes two to eight Si layers 54.

In Examples 1 to 17, an organic material layer 52 is formed between the Si layers 54 by "Reduction" or by "Coating", whereas in Comparative Examples 1 to 5 the organic material layer 52 is not formed between the Si layers 54.

In the Li ion secondary batteries using the negative electrode 50, use was made of an electrolytic solution prepared by dissolving $LiPF_6$ in an aprotic organic solvent in a concentration of 1 mol/dm$^3$. In each of Examples 1 to 17 and Comparative Examples 1 to 5, a Li ion secondary battery 30 using the rolled electrode body shown in FIGS. 5A to 5B was produced.

Incidentally, in the cases where a coin type battery was manufactured by use of a negative electrode 50 obtained by forming a negative electrode active material layer 50b including two to eight Si layers 54 on only one side of a negative electrode current collector 12 and forming an organic material layer 52 between the Si layers 50b, correspondingly to Examples 1 to 17 and Comparative Examples 1 to 5, substantially the same results as those obtained in Examples 1 to 17 and Comparative Examples 1 to 5 were obtained, though details are omitted.

EXAMPLES 1 TO 17, COMPARATIVE EXAMPLES 1 TO 5

In each of Examples 1 to 17 and Comparative Examples 1 to 5, negative electrode active material layers 50b were formed respectively on both sides of a negative electrode current collector 12, to manufacture a rectangular type Li ion secondary battery 30 (rectangular type battery) shown in FIG. 5. In each of Examples 1 to 17 and Comparative Examples 1 to 5, a plurality of Si layers 54 were formed by vacuum evaporation, and in each of Examples 1 to 17, an organic material layer 52 was formed between each adjacent pair of the Si layers 54, to produce the negative electrode active material layer 50b.

<Surface Roughness of Negative Electrode Current Collector>

A Cu foil having a thickness of 20 μm and surface-roughened on both sides thereof was used as the negative electrode current collector 12. As shown in FIG. 6A, the surface roughness Rz of the Cu foil was set to 2.5 μm in Examples 1 to 8 and Comparative Examples 1 to 5, and the surface roughness Rz was varied in the range of 1.5 to 5 μm in Examples 9 to 17.

<Negative Electrode Active Material Layer>

The negative electrode active material layers 50b were formed respectively on both sides of the negative electrode current collector 50a by forming the Si layers 54 and the organic material layer(s) 52. As shown in FIG. 6A, the number of the Si layers 54 was two in Example 2 and Comparative Example 2, was five in Example 3 and Comparative Example 3, and was eight in the other examples than Examples 2 to 3 and Comparative Examples 2 to 3. The Si layer 54 was formed by vacuum evaporation of single crystal Si at a film growth rate of 50 nm/sec. The total thickness of the negative electrode active material layer 50b was 5 to 6 μm.

In addition, as shown in FIG. 6A, in each of Examples 1 to 6 and 9 to 17, the organic material layer 52 was composed of a reduction decomposition product of an electrolytic solution (formed by reduction decomposition of the electrolytic solution used in the Li ion secondary battery) and formed on the surface of each Si layer 54. In each of Examples 7 and 8, the organic material layer was formed without use of the step shown in FIG. 2. In Example 7, the organic material layer 52 was formed between each adjacent pair of the Si layers 54 by applying PEO (polyethylene oxide), followed by drying. In Example 8, the organic material layer 52 was formed between each adjacent pair of the Si layers 54 by applying a PEO-PVdF (polyethylene oxide-polyvinylidene fluoride) copolymer, followed by drying.

Incidentally, in each of Comparative Examples 1 to 5, the negative electrode active material layer 50b was composed of the Si layers 54, and did not include any organic material layer 52.

<Organic Solvent of Electrolytic Solution>

As shown in FIG. 6A, a mixed solvent prepared by mixing EC, DEC, and VD in a mass ratio of EC:DEC:VD=30:60:10 was used in Example 1 and Comparative Example 1; a mixed solvent prepared by mixing FEC and DEC in a mass ratio of FEC:DEC=30:70 was used in Examples 2 to 4 and 7 to 17 and Comparative Examples 2 to 4; a mixed solvent prepared by mixing EC, DEC, VC, and PRS in a mass ratio of EC:DEC:VC:PRS=30:60:9:1 was used in Example 5 and Comparative Example 5; and a mixed solvent prepared by mixing DFEC and DEC in a mass ratio of DFEC:DEC=30:70 was used in Example 6.

<Electrolyte Salt in Electrolytic Solution>

As above-mentioned, $LiPF_6$ was dissolved in the mixed solvent in a concentration of 1 mol/dm$^3$.

<Fabrication of Negative Electrode 31>

First, the circular can rolls 4a, 4b were disposed in the can roll installation chamber 2a in the vacuum chamber 2 shown in FIG. 3A. Next, a belt form electrolytic copper foil as the belt form negative electrode current collector 12 was disposed in contact with the outer peripheral surfaces of the circular can rolls 4a, 4b, the guide rollers 13a, 13b, 13c, 13e, 13f, the feed roller 13d, and the rollers 14a, 14b.

By use of high-purity single crystal Si as the vapor deposition material, (1) the Si layer 54 was formed by vacuum evaporation, then (2) the organic material layer 52 was formed as above-described referring to FIG. 2, and (3) the operations of (1) and (2) were repeated a required number of times, to form the negative electrode active material layers 50b respectively on both sides of the belt form negative electrode current collector 12. Thereafter, the negative electrode lead 34 is attached, to fabricate the negative electrode 31.

<Analysis of Negative Electrode>

After the fabrication of the negative electrode 31, a section of the negative electrode before assemblage of a battery was analyzed, to confirm the constituent elements of the portion between the Si layers. Incidentally, the scanning electron microphotograph showing a sectional structure of the negative electrode indicative of the configuration of the negative electrode active material layer, shown in FIG. 1B above, is relating to a specified portion of the negative electrode produced in one of Examples. The elemental analyses of portions between the Si layers in the negative electrode active material layer are the results of analysis by SEM-EDX.

<Fabrication of Li Ion Secondary Battery 30>

In forming the positive electrode, a powder of lithium cobalt oxide ($LiCoO_2$) with a mean particle diameter of 5 μm as a positive electrode active material, carbon black as a conductive material, and polyvinylidene fluoride (PVdF) as a binder were mixed in a mass ratio of (lithium cobalt oxide):(carbon black):(polyvinylidene fluoride)=92:3:5, and the mixture was dispersed in N-methylpyrrolidone (NMP) used as a dispersant, to obtain a compound slurry.

Thereafter, the compound slurry was applied to a positive electrode current collector composed of an aluminum (Al) foil having a thickness of 15 μm, the dispersant was evaporated off to effect drying, and compression molding was conducted to form a positive electrode active material layer, thereby fabricate a positive electrode. Thereafter, the positive electrode lead 35 was attached, to complete the positive electrode 32.

Next, the negative electrode 31 and the positive electrode 32 were made to face each other with a separator 33 sandwiched therebetween, and the rolled electrode body 36 was produced. As the separator 33, a 23 μm-thick separator having a structure of being sandwiched by a film composed mainly of microporous polyethylene was used.

Subsequently, the rolled electrode body 36 was inserted in a rectangular type battery can 37, and a battery cap 38 was welded to the opening part of the battery can 37. Next, an electrolytic solution was fed into the battery can 37 through an electrolytic solution feed port formed in the battery cap 38, and the feed port was sealed off, to assemble a Li ion secondary battery 30.

<Evaluation of Li Ion Secondary Battery>

Each of the Li ion secondary batteries 30 fabricated as above was subjected to a charge-discharge test at 25° C. In this case, only the first charge-discharge cycle was conducted by a method in which (1) charging is conducted at a constant current density of 0.2 mA/cm² until the battery voltage reaches 4.2 V, subsequently (2) charging is conducted at a constant voltage of 4.2 V until the current density reaches 0.05 mA/cm², and then (3) discharging is conducted at a constant current density of 0.2 mA/cm² until the battery voltage reaches 2.5 V.

Thereafter, the second cycle was conducted by a method in which (1) charging is conducted at a current density of 0.2 C based on the battery capacity until the battery voltage reaches 4.2 V, subsequently (2) charging is conducted at a constant voltage of 4.2 V until the current density reaches 0.1 mA/cm2, and then (3) discharging is conducted at a current density of 0.2 C based on the battery capacity until the battery voltage reaches 2.5 V.

The load characteristic β (β here represents the battery capacity retention factor at each discharge current value when the load current was varied on the basis of each cycle) was measured by a method in which (1) charging is conducted at a current density of 0.2 C based on the battery capacity until the battery voltage reaches 4.2 V, subsequently (2) charging is conducted at a constant voltage of 4.2 V until the current density reaches 0.1 mA/cm², and then (3) discharging is conducted at a current density of 2 C based on the battery capacity until the battery voltage reaches 2.5 V. The load characteristic β was calculated from the discharge capacity at 2 C relative to the discharge capacity at 0.2 C.

Here, the current value at the time of discharge is represented in time rate (C), where time rate (C)=|current(mA)|/|nominal capacity(mAh)|. Specifically, 1 C represents the theoretical current for bringing a battery from the fully charged state to the completely discharged state (or vice versa) in 1 hr.

In addition, each of the Li ion secondary batteries assembled was subjected to a charge-discharge cycle test, to measure the capacity retention factor. One cycle in this cycle test consists of three steps of firstly (1) charging at a constant current of 3 mA/cm² until the battery voltage reaches 4.2 V, subsequently (2) charging at a constant voltage of 4.2 V until the current density reaches 0.3 mA/cm², and then (3) discharging at a constant current of 3 mA/cm² until the battery voltage reaches 2.5 V. This charge-discharge cycle was repeated 100 times at room temperature, and the capacity retention factor α (%) upon the 100th cycle, defined by the following formula:

Capacity retention factor α(%) upon

100th cycle = [(Discharge capacity at 100th cycle)/

(Discharge capacity at 2nd cycle)] × 100(%)

was examined.

A performance comparison between Examples 1 to 17 and Comparative Examples 1 to 5 reveals the following.

(1) A comparison between Examples 1 to 17 and Comparative Examples 1 to 5 shows that when the organic material layer 52 is formed between the Si layers 54 in the negative electrode active material layer 50b by reduction decomposition of the electrolytic solution or by application of the organic material and drying the organic material applied, both the capacity retention factor α and the load characteristic β are enhanced.

(2) The results of Examples 2 to 4 show that the capacity retention factor α and the load characteristic β tend to be more enhanced as the number of the organic material layers 52 is greater.

(3) A comparison between Examples 1, 4 and 6 to 8 shows that the capacity retention factor α and the load characteristic β are better in the cases where the organic material layers 52 formed contain fluorine (F). Specifically, better capacity retention factor α and load characteristic β can be realized by the organic material layers 52 formed through reduction decomposition of an electrolytic solution using the fluorine atom-containing DFEC or FEC as the solvent, or by coating with a fluorine-containing organic layer.

(4) A comparison between Example 1 and Example 5 shows that the capacity retention factor α and the load characteristic β are better also in the case where the organic material layers 52 formed contain sulfur (S). Specifically, better capacity retention factor α and load characteristic β can be realized by the organic material layers 52 formed through reduction decomposition of the electrolytic solution using the organic compound containing the functional group S=O as the solvent.

(5) A comparison between Examples 4 and 9 to 17 shows that in the case where the negative electrode active material layers 50b including a plurality of Si layers 54 and organic material layers 52 each formed between the Si layers 54 are formed on the negative electrode current collector 12 (50a), better capacity retention factor α and load characteristic β can be realized when the surface roughness Rz of the current collector 12 (50a) is in the range of 2.0 to 4.5 μm, as seen from FIG. 6A (see FIG. 6B). This is probably because the organic material layers 52 present between the Si layers 54 are effective in relaxing the stresses attendant on expansion and contraction of the Si layers 54 in the negative electrode active material layer 50b at the lime of the expansion and contraction, if the surface roughness is within the above-mentioned range.

Incidentally, the results of Examples 9 and 17 show that when the surface roughness Rz of the negative current collector 12 (50a) is too large or too small, a good load characteristic β cannot be obtained.

While the negative electrode active material layer 50b having the structure of the columnar bodies 56 has been mainly described above, a negative electrode 50 wherein a negative electrode active material layers 50b not having the structure of the columnar bodies 56 yet having the Si layers 54 and the organic material layers 52 formed alternately are formed on the negative electrode current collector 50a may also be adopted, since if the organic material layers 52 are formed from the reduction decomposition product of the electrolytic solution as above-mentioned, the presence of the organic material layers 52 inside the negative electrode active material layers 50b makes it possible to relax the stresses generated in the negative electrode active material layers 50b attendant on the charge and discharge, and to secure a stable operation of the Li ion secondary battery for a long time, like in the case of the negative electrode 50 in which the negative electrode active material layers 50b having the structure of the columnar bodies 56 as above-mentioned are formed on the negative electrode current collector 50a.

While the present application has been described above referring to the embodiments and examples thereof, the application is not limited to the above-described embodiments and examples, and various modifications can be made on the basis of the technical thought of the invention.

For example, while the case of using the rectangular can as the outer packaging member has been described in the above-mentioned embodiments and examples, the embodiment is applicable also to the cases where film form packaging material or the like is used as the outer packaging member. The shape of the outer packaging member may be any arbitrary shape, examples of which include coin type, cylindrical type, button type, thin type, and large type, in addition to the rectangular type mentioned above. In addition, the present application is similarly applicable also to stack type batteries in which pluralities of layers of negative electrodes and positive electrodes are stacked. The structure of the battery can be designed in an arbitrary manner according to the necessity and so as to conform to the use of the battery and to satisfy the desired performance conditions.

As has been above-described, according to the embodiment, it is possible to provide a Li ion secondary battery in which Si or the like is used as a negative electrode active material, with which a high energy capacity and good cycle characteristics can be realized, and which can be suitably used for reductions in size, weight and thickness of mobile type electronic apparatuses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A negative electrode comprising:
a negative electrode current collector; and
a negative electrode active material layer formed over said negative electrode current collector and including a plurality of columnar bodies, wherein
an organic material layer having ion conductivity is held by said negative electrode active material layer, said organic material layer is formed at least in an inside of each of said columnar bodies, wherein
each said columnar body includes a plurality of thin film layers formed from an active material permitting insertion therein and release therefrom of metal ions, wherein said active material contains Si or a compound of Si.

2. The negative electrode as set forth in claim 1, wherein said organic material layer is a reduction decomposition product of an electrolytic solution.

3. The negative electrode as set forth in claim 2, wherein said electrolytic solution contains an aprotic organic solvent, and said aprotic organic solvent is at least one solvent selected from among oxygen-containing solvents, sulfur-containing solvents, and fluorine-containing solvents.

4. The negative electrode as set forth in claim 2, wherein said electrolytic solution contains an aprotic organic solvent, and said aprotic organic solvent has at least one selected among a functional group $C=O$, a functional group $S=O$, and a functional group F.

5. The negative electrode as set forth in claim 2, wherein said electrolytic solution contains an aprotic organic solvent, and said aprotic organic solvent is a cyclic or chain carbonic acid ester of which hydrogen is at least partly fluorinated.

6. The negative electrode as set forth in claim 1, wherein an element constituting said negative electrode current collector is diffused in said columnar bodies.

7. The negative electrode as set forth in claim 1, wherein said negative electrode current collector has a surface roughness (Rz) of 1.8 to 4.8 μm.

8. The negative electrode as set forth in claim 1, wherein said negative electrode current collector has a surface roughness (Rz) of 2.0 to 4.5 μm.

9. A battery comprising:
an electrolytic solution;
a positive electrode; and
a negative electrode,
wherein said negative electrode includes
a negative electrode current collector, and
a negative electrode active material layer formed over said negative electrode current collector and including a plurality of columnar bodies, and an organic material layer having ion conductivity is held by said negative electrode active material layer, said organic material laver is formed at least in all inside of each of said columnar bodies, wherein
each said columnar body includes a plurality of thin film layers formed from an active material permitting insertion therein and release therefrom of metal ions, wherein
said active material contains Si or a compound of Si.

10. The battery as set forth in claim 9, wherein said organic material layer is a reduction decomposition product of an electrolytic solution.

11. The battery as set forth in claim 10, wherein said electrolytic solution contains an aprotic organic solvent, and said aprotic organic solvent is at least one solvent selected from among oxygen-containing solvents, sulfur-containing solvents, and fluorine-containing solvents.

12. The battery as set forth in claim 10, wherein said electrolytic solution contains an aprotic organic solvent, and said aprotic organic solvent has at least one selected among a functional group $C=O$, a functional group $S=O$, and a functional group F.

13. The battery as set forth in claim 10, wherein said electrolytic solution contains an aprotic organic solvent, and said aprotic organic solvent is a cyclic or chain carbonic acid ester of which hydrogen is at least partly fluorinated.

14. The battery as set forth in claim 9, wherein an element constituting said negative electrode current collector is diffused in said columnar bodies.

15. The battery as set forth in claim 9, wherein said negative electrode current collector has a surface roughness (Rz) of 1.8 to 4.8 μm.

16. The battery as set forth in claim 9, wherein said negative electrode current collector has a surface roughness (Rz) of 2.0 to 4.5 μm.

* * * * *